(12) United States Patent
Dantzig et al.

(10) Patent No.: US 11,573,832 B2
(45) Date of Patent: *Feb. 7, 2023

(54) HIGHLY ORDERED TRANSACTION PROCESSING

(71) Applicant: International Business Machines Corporation, Armonk, NY (US)

(72) Inventors: Paul M. Dantzig, Scarsdale, NY (US); Donna N. Dillenberger, Yorktown Heights, NY (US); Arun Kwangil Iyengar, Yorktown Heights, NY (US); Francis Nicholas Parr, New York, NY (US); Gong Su, New York, NY (US)

(73) Assignee: International Business Machines Corporation, Armonk, NY (US)

(*) Notice: Subject to any disclaimer, the term of this patent is extended or adjusted under 35 U.S.C. 154(b) by 1271 days.

This patent is subject to a terminal disclaimer.

(21) Appl. No.: 15/936,967

(22) Filed: Mar. 27, 2018

(65) Prior Publication Data

US 2018/0218294 A1    Aug. 2, 2018

Related U.S. Application Data

(63) Continuation of application No. 11/766,932, filed on Jun. 22, 2007, now Pat. No. 9,965,731.

(51) Int. Cl.
*G06F 9/50*    (2006.01)
*G06Q 10/06*    (2012.01)

(52) U.S. Cl.
CPC .... *G06F 9/5038* (2013.01); *G06F 2209/5021* (2013.01); *G06Q 10/06* (2013.01)

(58) Field of Classification Search
CPC ............ G06F 11/1471; G06F 11/1474; G06F 11/0709; H04L 47/50
See application file for complete search history.

(56) References Cited

U.S. PATENT DOCUMENTS

| 4,400,775 A | 8/1983 | Nozaki et al. |
| 4,956,772 A | 9/1990 | Neches |
| 6,892,319 B2 | 5/2005 | Qadeer |
| 7,562,363 B1 | 7/2009 | Belair et al. |
| 7,933,830 B1 | 4/2011 | Buck |

(Continued)

FOREIGN PATENT DOCUMENTS

WO  PCT/US2008/060437    6/2008

OTHER PUBLICATIONS

A. Spauster, "Ordered and Reliable Multicast Communication," A Dissertation presented to the faculty of Princeton University, University Microfilms International, 1991.

(Continued)

*Primary Examiner* — Tom Y Chang
(74) *Attorney, Agent, or Firm* — Kurt Goudy; Ryan, Mason & Lewis, LLP

(57) ABSTRACT

Improved techniques are disclosed for processing transactions or requests in a data processing system. For example, a method for processing requests in a system including a plurality of nodes includes the following steps. At least two nodes of the plurality of nodes receive a plurality of requests. The two nodes exchange information to determine an order for processing requests. The two nodes process the requests in accordance with the order. The order may include a total order or a partial order.

20 Claims, 14 Drawing Sheets

(56) References Cited

U.S. PATENT DOCUMENTS

| | | | |
|---|---|---|---|
| 8,090,641 B1* | 1/2012 | Monroe | G06Q 40/04 705/37 |
| 2002/0120837 A1* | 8/2002 | Maxemchuk | G06Q 40/04 713/153 |
| 2002/0129087 A1* | 9/2002 | Cachin | H04L 63/12 709/200 |
| 2002/0143692 A1 | 10/2002 | Heimermann et al. | |
| 2003/0074206 A1 | 4/2003 | Hoffman et al. | |
| 2004/0068479 A1 | 4/2004 | Wolfson et al. | |
| 2005/0165670 A1 | 7/2005 | Woodmansey et al. | |
| 2005/0246190 A1 | 11/2005 | Sandor et al. | |
| 2006/0235785 A1 | 10/2006 | Chait | |
| 2007/0016459 A1 | 1/2007 | King et al. | |
| 2007/0016560 A1 | 1/2007 | Gu et al. | |
| 2007/0083457 A1 | 4/2007 | Evelyn et al. | |
| 2007/0192230 A1 | 8/2007 | Meacham et al. | |
| 2007/0198465 A1 | 8/2007 | Meacham et al. | |
| 2008/0126833 A1 | 5/2008 | Callaway et al. | |
| 2008/0310444 A1* | 12/2008 | Dekel | H04L 12/1881 370/432 |

OTHER PUBLICATIONS

X. Defago et al., "Total Order Broadcast and Multicast Algorithms: Taxonomy and Survey," ACM Computing Surveys, vol. 36, No. 4, Dec. 2004, pp. 372-421.

F. Schneider, "Implementing Fault-tolerant Services Using the State Machine Approach: A Tutorial," ACM Computing Surveys, vol. 22, No. 4, Dec. 1990, pp. 299-319.

M. Mizuno et al., "Sequential Consistency in Distributed Systems," Lecture Notes in Computer Science, Conference Papers and Proceedings, pp. 224-241, 1995.

R. Guerraoui et al., "Fault Tolerance by Replication in Distributed Systems," Lecture Notes in Computer Science, pp. 38-57, 1996.

D. Wildfogel et al., "Efficient Testing of High Performance Transaction Processing Systems," Proceedings of the 23rd VLDB Conference, 1997, 4 pages, Greece.

M. Castro et al., "Practical Byzantine Fault Tolerance," Proceedings of the Third Symposium on Operating Systems Design and Implementation, Feb. 1999, pp. 1-14, New Orleans.

A. Iyengar et al., "High-Performance Web Site Design Techniques," IEEE Internet Computing, Mar./Apr. 2000, pp. 17-26, vol. 4, No. 2.

* cited by examiner

HIGHLY ORDERED TRANSACTION PROCESSING

FIELD OF THE INVENTION

The present application relates to data processing systems and, more particularly, to techniques for ordering of transaction processing in such data processing systems.

BACKGROUND OF THE INVENTION

With respect to data processing systems that process high rates of requests or transactions (also referred to herein as transaction processing systems), it is known that such transaction processing systems need to be fault tolerant. In order to handle failure of a single processing node, the system typically utilizes multiple processing nodes. That way, if one node fails, at least one other node is available to continue processing requests.

In general, the nodes processing requests may have state. In order for a node n2 to take over for a failed node n1, the state of n2 has to be updated with the state of n1. One way this has been done in the past is to have a primary node along with a back-up node that follows the same transactions as the primary node, but a few steps behind. That way, if the primary fails, the back-up can take over for the primary.

A key problem with this approach is that some work needs to be done in the event of a failure of the primary, both in detecting the primary failure and then in getting the back-up to take over for the primary. In many mission-critical environments, this disruption in the event of a failed primary is not acceptable.

Accordingly, what is needed is improved techniques for processing transactions in a data processing system.

SUMMARY OF THE INVENTION

Principles of the invention provide improved techniques for processing transactions or requests in a data processing system.

For example, in a first aspect of the invention, a method for processing requests in a system including a plurality of nodes includes the following steps. At least two nodes of the plurality of nodes receive a plurality of requests. The two nodes exchange information to determine an order for processing requests. The two nodes process the requests in accordance with the order. The order may include a total order or a partial order.

The exchanging step may include the two nodes communicating via exchanging at least one message. Alternately, the exchanging step may include the two nodes communicating via at least one memory shared by the two nodes. Accesses to the memory shared by a first node of the two nodes may incur significantly more overhead than a main memory access of the first node. Accesses to the memory shared by the first node may be minimized to reduce overhead.

The method may also include the following steps. A plurality of gateway nodes receives sets of requests, respectively. Each gateway node of the plurality of gateway nodes orders requests in its respective set of requests resulting in a plurality of orderings. The order for processing requests may be determined in accordance with the plurality of orderings. The two nodes receive requests from the plurality of gateway nodes.

The method may further include the following steps. A result of processing a request is recorded in persistent storage. Completion of the recording step triggers an acknowledgement that a request has completed. The persistent storage includes a file system or a database.

Further, a request may be classified into a sliding window based on how much of the request has executed.

In a second aspect of the invention, a system for executing requests includes at least two nodes for executing requests in accordance with an order, and at least one shared memory for use in determining the order for executing the requests from information provided by the two nodes.

In a third aspect of the invention, a system for executing requests includes means for determining an order for executing requests from information provided by at least two nodes, and the two nodes executing requests in accordance with the order such that the requests are redundantly processed.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

While certain illustrative embodiments of the invention will be described herein from the perspective of financial transactions, it is to be understood that principles of the invention are not limited to use with any particular application or data processing system. Rather, principles of the invention are more generally applicable to any application and any data processing system in which it would be desirable to provide improved ordering of transaction processing.

In order to overcome the above-mentioned drawback in existing transaction processing systems (i.e., in the event of a failure of the primary node in an existing transaction processing system, costly efforts must be exerted in detecting the primary failure and then in getting a back-up node to take over for the primary node), principles of the invention employ a "primary-primary" design concept. Such a primary-primary design concept makes no differentiation between a primary node and a secondary or back-up node.

Figure 1:
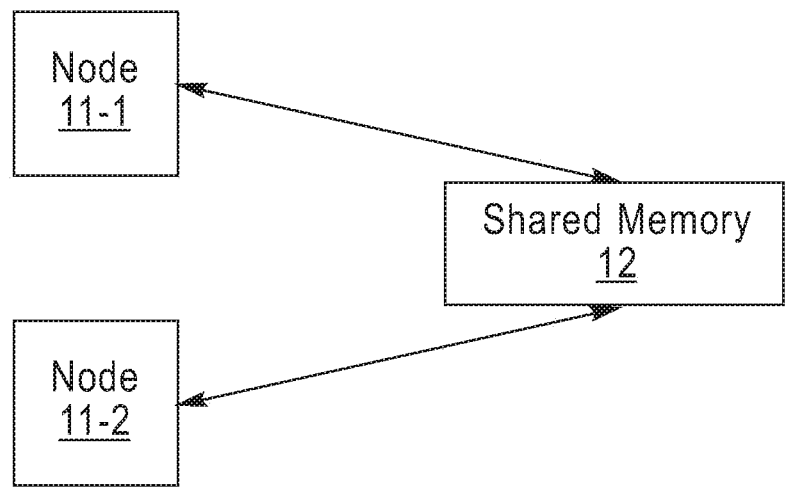
FIG. 1 shows a transaction processing system according to an embodiment of the invention.

FIG. 1 shows a transaction processing system according to one embodiment of the invention. As shown, the illustrative transaction processing system includes a plurality of processing nodes 11, wherein each processing node (11-1 and 11-2) acts as a primary node. The processing nodes are coupled to a shared memory 12.

It is to be appreciated that such processing nodes may be logically allocated portions of processing resources (virtual machines) within one computing system, such as a mainframe computer. Alternatively, such processing nodes may be one or more types of computing devices, e.g., server, personal computer, laptop computer, handheld computing device, etc. However, principles of the invention are not limited to any particular type of computing device or computing architecture. While the illustrative embodiment shows only two nodes, it is to be appreciated that the system can include more than two nodes.

Figure 2:
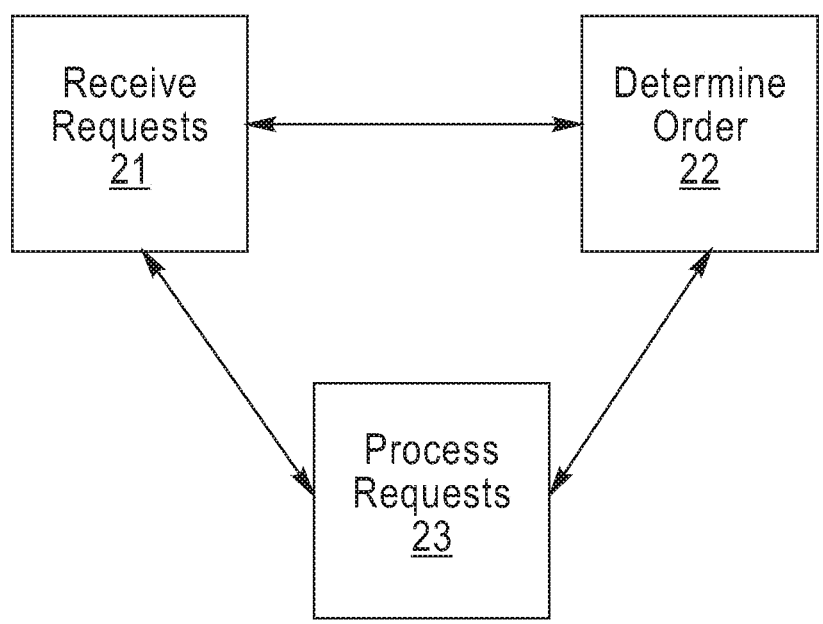
FIG. 2 shows a methodology for processing transactions according to an embodiment of the invention.

FIG. 2 illustrates a methodology for processing transactions in accordance with the two processing nodes in FIG. 1. Each of the nodes receives a plurality of requests (step 21 in FIG. 2). Nodes 11 should process the requests in a similar order. It is not necessarily the case that each of the nodes will receive the requests in the same order. Therefore, after the nodes receive the requests, they communicate to agree on a common order. A preferred method for such communication is via shared memory 12. The nodes use the shared memory to agree on a common order for processing requests (step 22 of FIG. 2). After the nodes have agreed on a common order for processing requests, the requests are executed by the nodes in this order (step 23 of FIG. 2).

Note that the system is constantly interleaving the steps 21-23. The system will execute some requests while continuing to receive and order newer requests. This will be described in detail below.

As mentioned, there is no guarantee that two nodes will receive messages in the same order. This is a key reason why step 22 is employed. If the nodes are receiving requests over a network, some messages may be lost in transit requiring retransmissions.

One optional variation is for one of nodes (e.g., 11-1) to store one or more requests in shared memory 12 after it receives the request. That way, if another node (e.g., 11-2) needs to execute the request next but has not yet received the request, the node can obtain the request from the shared memory. If shared memory 12 has low enough overhead, this approach would be advantageous as it would prevent a node from being blocked waiting for the request.

Another variation on this embodiment is for the nodes to determine an order by communicating with each other instead of using a shared memory.

The ordering constraints that are to be obeyed by the nodes may constitute a total ordering or a partial ordering. In a total ordering, all nodes execute the requests in the same order. For example, if there are five requests r1, r2, r3, r4, and r5, then a total ordering on these requests could be that all nodes execute the requests in the order r2, r1, r3, r5, and r4. A partial ordering is not as stringent as a total ordering. An example of a partial ordering would be that all nodes execute r2 before r1 and r3 before r5; there are several different orderings which are consistent with this partial ordering. Principles of the invention are applicable to both total ordering constraints as well as partial ordering constraints.

In some of the examples which follow, the processing nodes receive requests from various gateway nodes. Each gateway node $g_i$ assigns an ordering of to the requests it sends to a node. The system should obey the ordering $o_i$. For requests coming from different gateways, however, the system has some flexibility in how it merges request streams from the gateways.

We now describe another embodiment of the invention in the context of a highly available system for financial exchanges. The following background information is important for understanding this embodiment.

Market matching is a core component needed to manage trading in a set of financial instruments. A market matching service typically maintains a set of order books. Different order books may be maintained for different financial instruments traded. The order books may be used for processing arriving orders to buy and sell those instruments. Requests arriving at the market matching service may be a mixture of new orders, cancellations and modifications of previous orders, etc. A simple order is a request to buy or sell a specific quantity of a specific instrument on behalf of a specific customer at a named price or limit price. Refinements such as mass-quote, stop loss and all-or-nothing orders require additional features but do not change the basic pattern of processing.

Within the market matching function, arriving orders may be added sequentially into an order book for an instrument it refers to. A market matching engine should then identify and execute one or more orders which can be traded immediately. It does this by matching a newly arrived order with other matching orders already in the book for that instrument. Orders to sell are matched with orders to buy for the same instrument at the same price and conversely.

Published business rules govern how this matching of orders is to be done. For example, orders might have to be processed fairly and in the sequence in which they are received. Orders might always have to be satisfied at the best matching price available and for as much of the quantity specified in the arriving order as is possible at that price and time. If there is a choice of matching orders at the best price, published allocation rules may govern which matching orders will be selected for trading.

A market matching function may also be responsible for generating acknowledgements when it has processed an order, reporting on successfully applying an order to the market book and on trades executed involving that order. A gateway function is to return these acknowledgements to the customer. The market matching function may also be responsible for generating and distributing market information describing the current market liquidity and recently executed trades anonymously.

Customers may interact with a market matching function of an exchange through sessions with a set of gateways—we also use the term gateway processing nodes. The gateways may handle the communication and client session processing for an individual client's electronic connection to the exchange. One client may be interacting with multiple trading products in an exchange and with multiple order books within each trading product. The gateway processing may be responsible for forwarding orders from customers to an appropriate market matching function and getting acknowledgements from the market matching function delivered back to the customer.

Since reliability may be a critical requirement on the market matching function, market matching processing may be organized so as to have secondary market matching capability prepared and ready to take over processing responsibility from primary market matching capability in the event of a market matching engine failure.

An electronic market matching engine may operate in a continuous loop executing a sequence of logical steps for received requests similar to the following:

Buy and sell orders are received for parsing, matching, and sequencing (they may have already been assigned conversation sequence numbers to ensure that the messages for each customer conversation are handled in the correct order, but now primary node sequencing numbers are added to fix the ordering between requests from different customers and to enable standby and failover processing by a secondary).

Order cancellations and modifications are applied to orders in the book.

New orders are placed in the book and logged to ensure recovery over a system failure.

The matching engine determines whether a newly arrived or modified order is tradable immediately because there are previous opposing orders in the book matching the newly arrived or modified order.

An allocation algorithm is run to determine the exact orders to trade following precisely defined business rules.

All successfully completed and logged actions including order placement, and completed trades are acknowledged back to the trading or requesting customers via gate processing; anonymized reports on executed trades and market liquidity are also published as market data.

The logged orders and trades are streamed into a database where they may be available to surveillance queries by, for example, control center staff.

In addition, a market matching system may provide operator facilities to start, stop, pause and monitor markets (sets of books). It may also provide facilities to allow operators to locate books within the matching engine and orders of a particular customer, and process them individually, or make manual corrections.

In the context of such a market matching environment, the primary-primary design concept of the invention (such as is embodied in the transaction processing system of FIG. 1) operates, at a high level, as follows:

A request is sent to both nodes carrying the appropriate order book.
A total ordering of requests is worked out by both nodes.
Both nodes perform the same request processing independently.
A request is complete when either or both nodes finish the request processing.

Duplicate messages of request completed or history recording are ignored.

Since, at any given time, there are two nodes processing a request, a transient request message loss to any one node or any one node failure will not cause a disruption. Also, there is no requirement for a reliable message delivery mechanism, therefore higher throughput and lower latency can be exploited.

It is to be appreciated that although two-node redundancy is used as the example throughout the description of illustrative embodiments, the design concepts of the invention may be applied to achieve any n-node redundancy.

On a mainframe platform such as the "Z platform," available from IBM Corporation (Armonk, N.Y.), GW (gateway) nodes, EV (execution venue) nodes, and HR (history recorder) nodes can all be in the same system with different LPARs (local partitions), or they can be cross-system in a sysplex (a cluster of zSeries LPARs or Machines that share a Coupling Facility—distributed shared memory, common clock—External Time Reference and Intersystem Channels—high speed links). Hipersockets and XES (extended service) can provide fast communication between OR and EV, and between EV and HR:

Hipersockets, LPAR to LPAR.
UDP (User Datagram Protocol), TCP (Transmission Control Protocol), IP (Internet Protocol) configured to use XES, cross systems.

Figure 3:
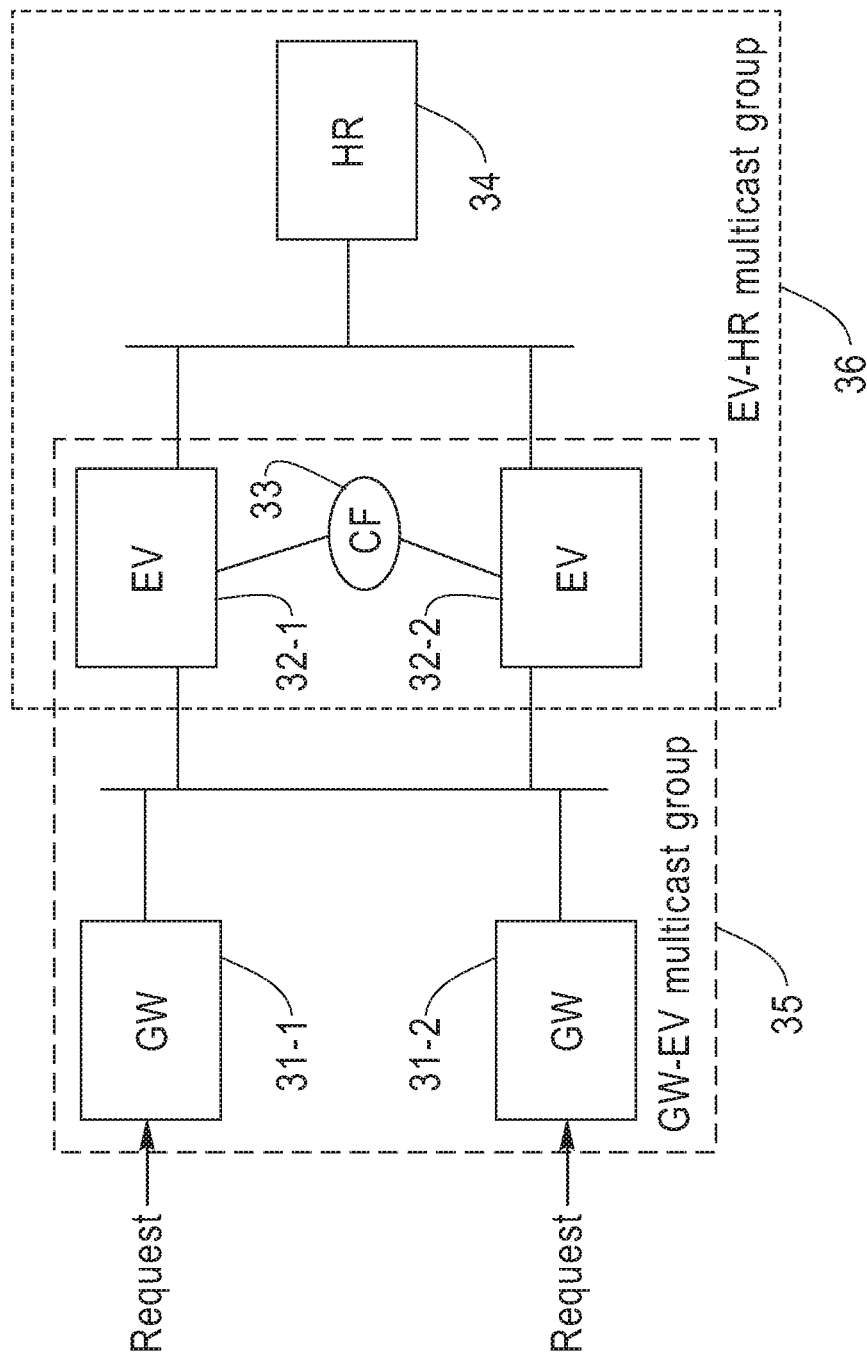
FIG. 3 shows a transaction processing system according to an embodiment of the invention.

We now describe, in detail, the interactions between the Gateway (GW) and the Execution Venue (EV), as well as the interactions between the EV and the History Recorder (HR), which are typically connected in a tiered fashion as shown in FIG. 3. As shown in FIG. 3, orders come into GW 31-1 and GW 31-2. EV 32-1 and EV 32-2 are in communication with GW 31-1 and GW 31-2. EV 32-1 and EV 32-2 are in communication with one another via CF (Coupling Facility) 33. EV 32-1 and EV 32-2 are in communication with HR 34.

Requests come into at least one gateway (GW) node and are then sent to execution venues (EV). The two EVs in the figure may be on separate nodes and thus might not share memory. The coupling facility (CF) provides shared memory for the two EVs in the figure to use to share information. HR is a history recorder which would typically have persistent storage (e.g., database, file system, etc.) which the system could use to store information persistently.

We assume here that total ordering for a book would not be enforced by the GWs, but rather by the EVs. Therefore, the illustrative embodiment described below does not describe the GWs in detail but rather makes a few assumptions about them:

GWs filter out duplicated incoming orders.
GWs harden each order before multicasting it to the EVs.
GWs have some form of failure recovery mechanism.

We assume that EVs will be running on the different LPARs (local partitions) of a Z machine (mainframe). Therefore, certain unique Z features such as Coupling Facility (CF) can be utilized to provide the total ordering of the requests for different EVs. Note that for better scalability, more than one CF can be used to connect different groups of LPARs.

If one compares FIG. 3 to FIG. 1, an EV is analogous to a node 11. A CF is analogous to shared memory 12.

For every order book, there are two multicast groups associated with it: one group consists of the GW and the two EVs carrying the order book (multicast group 35 in FIG. 3), the other group consists of the two EVs and the HR (multicast group 36 in FIG. 3). The use of multicast alleviates the need for maintaining a directory to keep track of which EV carries which order book. When a message for an order book needs to be sent to both EVs, it can simply be sent to the multicast address associated with the order book.

For every order of a particular order book, a monotonically increasing sequence number is assigned to the order by the CF. The sequence number allows EV and HR to ignore duplicate order completed and history recording messages. The sequence number also allows EV to detect delayed or lost order messages.

For message exchange between the GW and the EV, and between the EV and the HR, a sliding window and acknowledgement scheme similar to that of TCP is used:
- Incoming data messages are queued up to a maximum window size, and handled asynchronously.
- Receiver detects sequence number gap in the received messages and sends a "not acknowledged" (nack) message for the lost message.
- Sender resends a message if an acknowledgement (ack) message is not received for the sent message after a timeout threshold.

For simplicity, unless otherwise noted, the methodology described in the remainder of the detailed description is for a particular book. Therefore, no specific book number is mentioned. Of course, it is to be understood that the methodology is executed concurrently and independently for as many books as necessary for the stock exchange. We now describe messages and processing on the GW.

The GW sends three types of messages:
- REQmsg (to EV)—request, contains trade data to be processed.
- RQCack (to EV)—request completion acknowledgement, acknowledges that a RQCmsg has been received.
- RQCnack (to EV)—request completion lost, nack that one or more RQCmsgs have been lost.

The GW receives three types of messages:
- OMSmsg (from OMS)—request message from Order Management System (OMS).
- RQCmsg (from EV)—request completed, acknowledges that a REQmsg has been processed and persisted, also contains trade data as a result of processing the request.
- REQnack (from EV)—request lost, nack that one or more REQmsgs have been lost.

Figure 4:
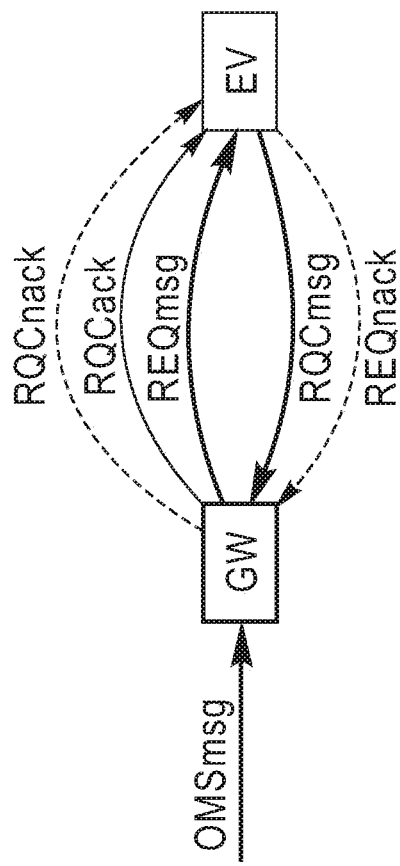
FIG. 4 shows a message type diagram for a gateway node according to an embodiment of the invention.

FIG. 4 illustrates the message types for the GW. In FIG. 4, a thick solid line denotes a message that carries data. A thin solid line denotes an acknowledgement message that does not carry data. A thin dashed line denotes a nack message that does not carry data. The message type diagrams for the EV and the HR follow the same convention.

Figure 5:
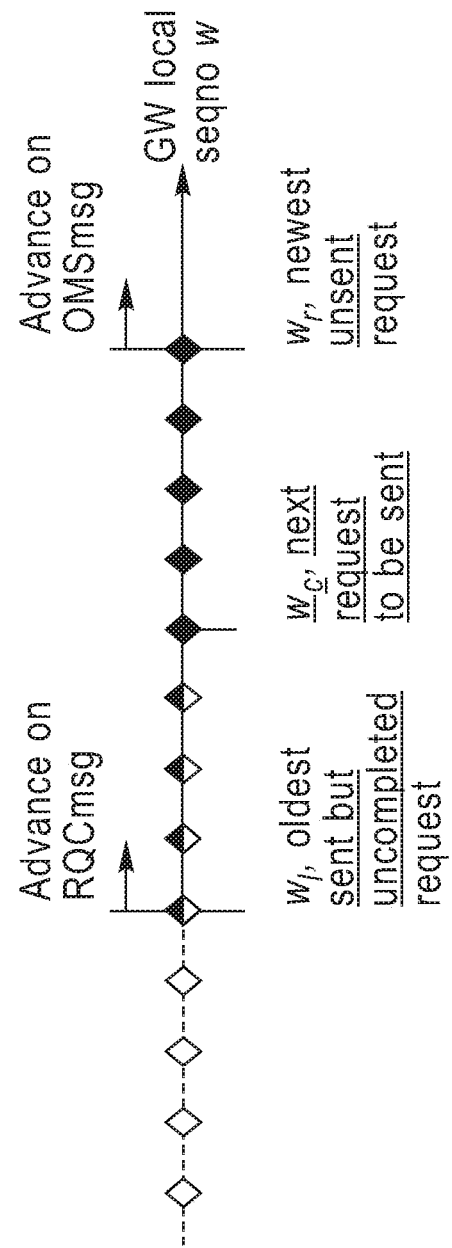
FIG. 5 shows a sliding window used by a gateway node in processing a sequence of requests according to an embodiment of the invention.

The GW maintains a local sequence number (seqno) w for each OMSmsg received from the OMS and its corresponding REQmsg sent to the EVs, and two windows of outstanding REQmsgs. Let $w_l$ denote the left edge of the window, which is the oldest sent but uncompleted REQmsg. Let $w_r$ denote the right edge of the window, which is the newest unsent REQmsg. Each received OMSmsg moves the right edge $w_r$ up by one, until the maximum window size $q_{GW}=w_r-w_l$ is reached. Each received RQCmsg moves the left edge $w_l$ up by one, until the window is empty. When the window is full, no more OMSmsgs will be processed by the GW. Between $w_l$ and $w_r$, $w_c$ denotes the next REQmsg to be sent to the EVs. The sliding window is illustrated in FIG. 5.

Intuitively, different windows represent requests in different states, as shown:
- $[w_c, w_r]$ (black diamond shape): requests that have not been sent to the EVs.
- $[w_l, w_c)$ (top black/bottom white diamond shape): requests that have been sent to the EVs, but not yet completed.
- $(\ldots, w_l)$ (white diamond shape): requests that have been sent and completed by the EVs.

Initially, $w_l=w_c=w_r$ (=0 not necessary as long as the numbers are agreed upon with the EVs). And the inequality $w_l<=w_c<=w_r$ holds at all times.

Figure 6:
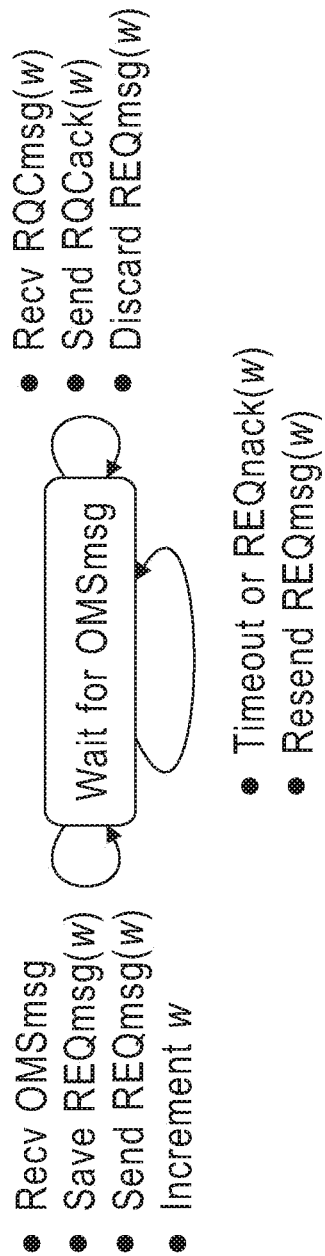
FIG. 6 shows a state transition diagram for a gateway node according to an embodiment of the invention.

The GW operates according to the state transition diagram shown in FIG. 6.

As long as $w_c<w_r$, the GW does the following:
- Multicast REQmsg(gid, $w_c$) to the EVs.
- Install timer for REQmsg(gid, $w_c$).
- Increment $w_c$.

When the GW receives an OMSmsg, it takes the following actions:
- If $w_r-w_l<q_{GW}$ (window not full) then
  - Enqueue REQmsg(gid, $w_r$).
  - Increment $w_r$.
- Otherwise (window full), the GW must wait for the window to shrink, which is possible only by receiving RQCmsgs.

When the GW receives an RQCmsg(gid, w), which means the EV is sending the GW request completion for w, it takes the following actions:
- If $w<w_l$, the EV has lost all the RQCacks from w to $w_l-1$ and is resending RQCmsg(gid, w) due to timeout. So the GW resends RQCack(gid, $w_l-1$) to the EV.
- If $w>w_l$, then
  - Nack for lost RQCmsg between $w_l$ and w−1 by sending RQCnack(gid, $w_l$, w−1).
  - Process trade data (if any) associated with RQCmsg (gid, w).
  - Cancel timer for REQmsg(gid, w).
  - Dequeue REQmsg(gid, w).
  - Do not send RQCack(gid, w) to the EV. Since RQCack (gid, w) is a "progress report" which means that all RQCmsgs up to w have been received.
- If $w=w_l$, then
  - Process trade data (if any) associated with RQCmsg (gid, w).
  - Cancel timer for REQmsg(gid, w).
  - Dequeue REQmsg(gid, w).
  - Advance $w_l$ to w', where all REQmsgs up to w'−1 have been dequeued.
  - Send RQCack(gid, w'−1) to the EV.

Note that it is impossible to have $w>w_r$.

When the GW receives an REQnack(gid, $w_1$, $w_2$), which means the EV is missing requests from $w_1$ to $w_2$ from the GW, it takes the following actions:
- If $w_1<=w_2<w_l$, the GW does nothing since requests from $w_1$ to $w_2$ have already been handled and discarded.
- If $w_1<w_l<=w_2$, the GW resends REQmsgs from $w_l$ to $w_2$.
- If $w_l<=w_1<=w_2$, the GW resends REQmsgs from $w_1$ to $w_2$.

Note that it is impossible to have $w_1<=w_c<w_2$ or $w_c<w_1<=w_2$.

When the timer for REQmsg(gid, w) fires, the GW multicasts REQmsg(gid, w) to the EVs. This happens when either the REQmsgs to all the EVs have been lost, or the RQCmsgs from all the EVs have been lost.

We now describe messages and processing on the EV.

Figure 7:
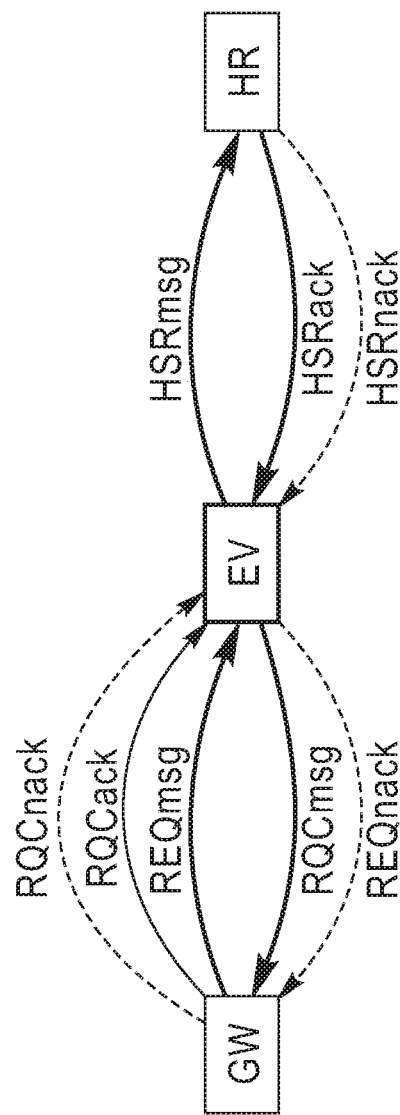
FIG. 7 shows a message type diagram for an execution venue gateway node according to an embodiment of the invention.

As shown in FIG. 7, the EV sends three types of messages:
- RQCmsg (to GW)—request completed, acknowledges that a REQmsg has been processed and persisted, also contains trade data as a result of processing the request.

REQnack (to GW)—request lost, nack that one or more REQmsgs have been lost.

HSRmsg (to HR)—history recording, contains trade data to be persisted.

Further, as shown in FIG. 7, the EV receives five types of messages:

REQmsg (from GW)—request, contains trade data to be processed.

RQCack (from GW)—request completion acknowledgement, acknowledges that a RQCmsg has been received.

RQCnack (from GW)—request completion lost, nack that one or more RQCmsgs have been lost.

HSRack (from HR)—history recording completed, acknowledges that a HSRmsg has been persisted.

HSRnack (from HR)—history recording lost, nack that one or more HSRmsgs have been lost.

The EV performs three major functions:

(1) Interact with the CF to map the incoming requests into a total ordering.

(2) Process the requests according to the total ordering.

(3) Interact with the HR to persist the request history and notify the GW.

We describe each function in more details below.

(1) Interact with the CF

Figure 8A:
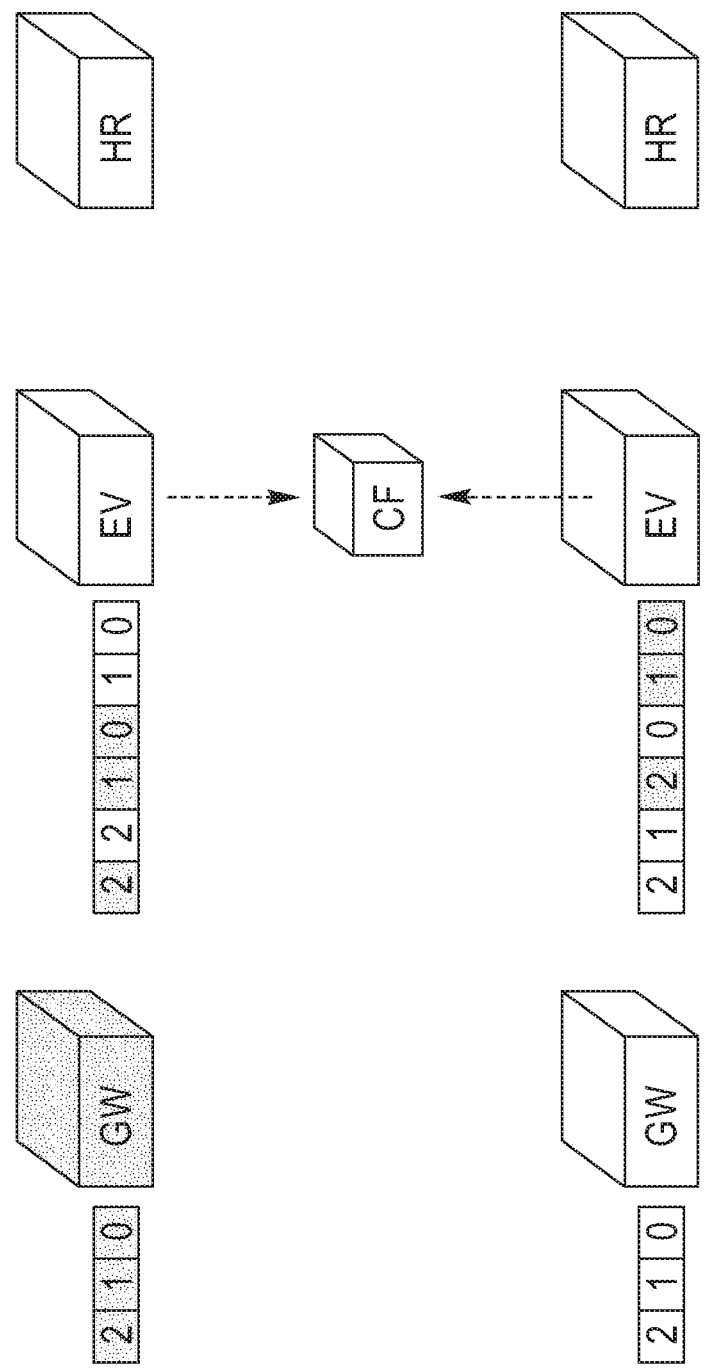
FIGS. 8A through 8D show an example of ordering of requests associated with two execution venue nodes according to an embodiment of the invention.
Figure 8B:
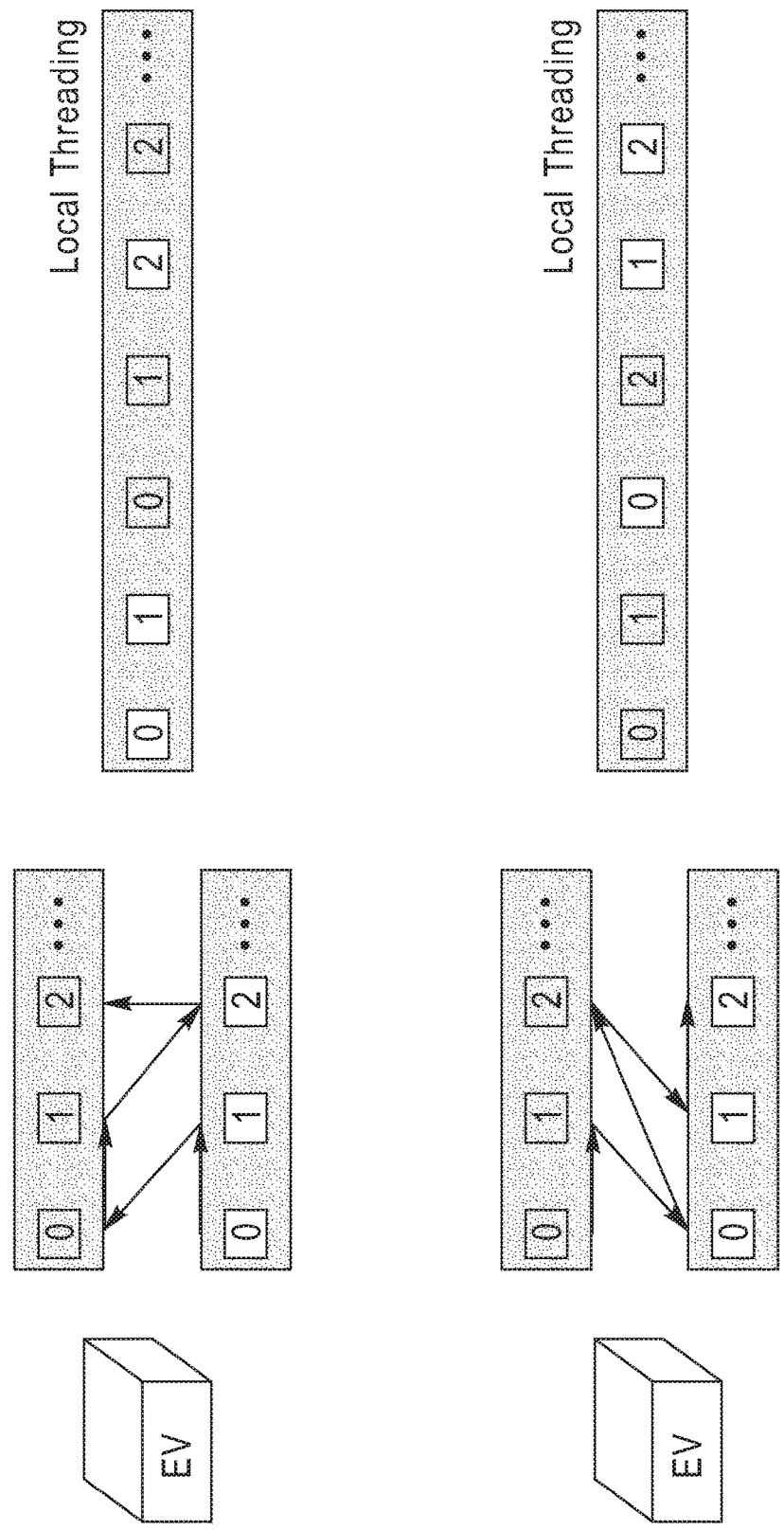
Figure 8C:
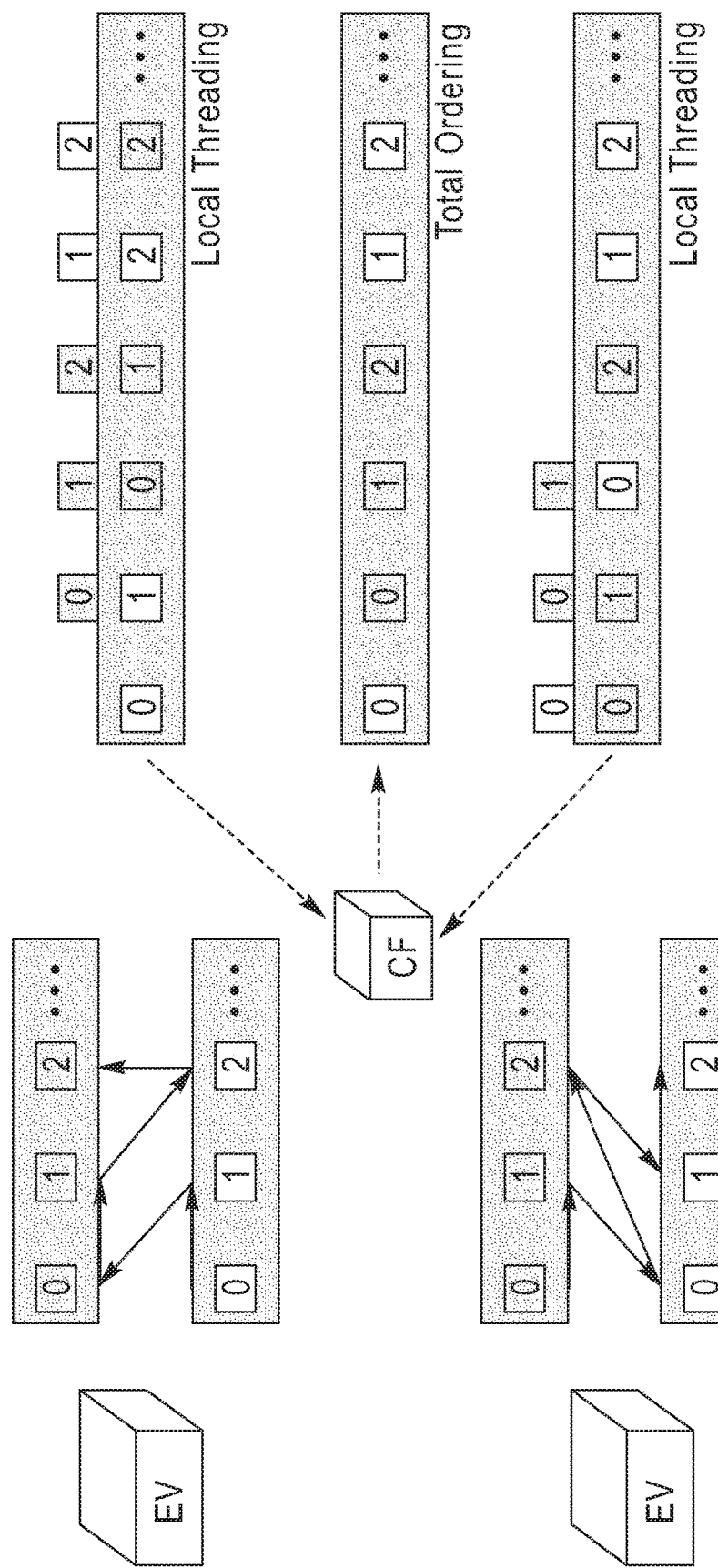

Each EV receives a stream of requests from multiple GWs. Requests from a particular GW have already been partially ordered by the GW's local seqno w. However, the total ordering for requests coming from all the GWs has to be determined and agreed upon by all the EVs. The underlying network is assumed to be unreliable and therefore can delay or lose messages. As a result, different EVs can see different orderings of requests coming from the GWs, as shown in FIG. 8A. The EV uses a GW's local seqno w to restore the ordering of the requests coming from that particular GW, and to propose a total ordering based on its own local threading of requests coming from all the GWs, as shown in FIG. 8B. The EVs then interact through the CF to determine the final total ordering for requests coming from all the GWs, as shown in FIG. 8C.

Figure 8D:
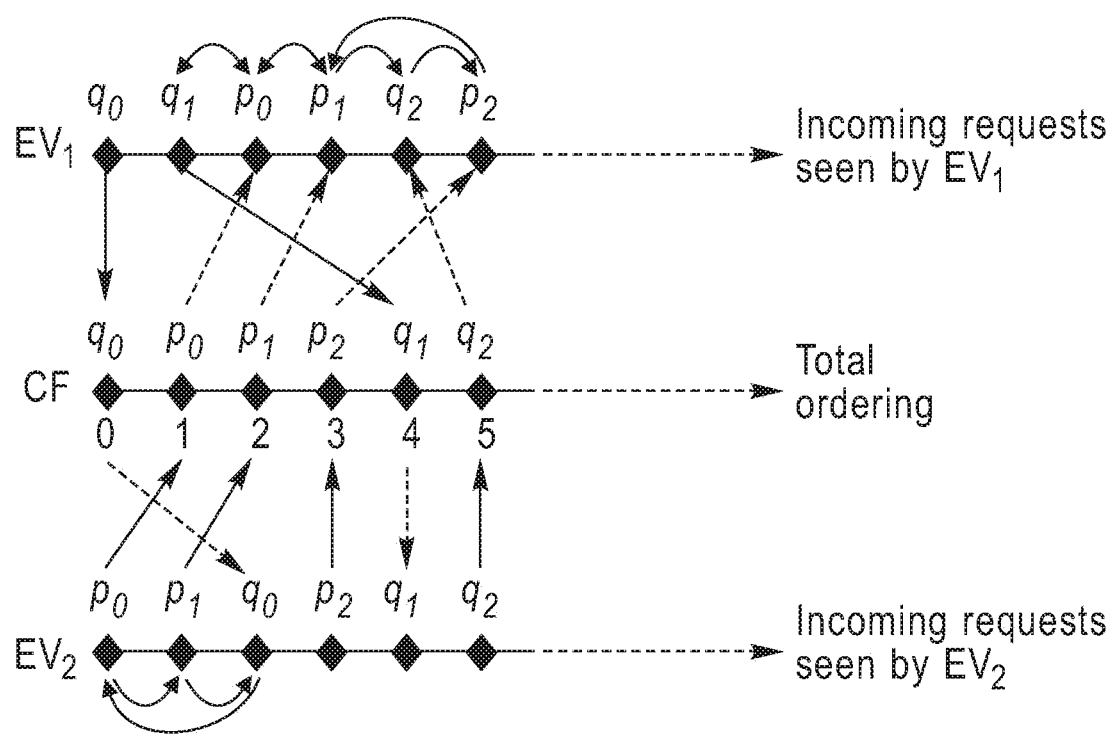

FIG. 8D shows one possible total ordering agreed upon by two EVs that have different local threadings. The diagram shows two EVs, $EV_1$ and $EV_2$, both receiving streams of requests from two GWs (not shown). Requests from one GW are denoted as $p_0$, $p_1$, $p_2$, etc., and requests from the other GW are denoted as $q_0$, $q_1$, $q_2$, etc. As shown, $EV_1$ has a local threading of $q_0$, $q_1$, $p_p$, $p_1$, $q_2$, $p_2$, while $EV_2$ has a local threading of $p_0$, $p_1$, $q_0$, $p_2$, $q_1$, $q_2$. The sequence of events leading to the total ordering is as follows:

$EV_1$ proposes $q_0$ and $EV_2$ proposes $p_0$. They compete for the total ordering number 0. $EV_1$ wins and $q_0$ is assigned to total ordering number 0. The solid arrow line from $q_0$ on $EV_1$ to number 0 on CF means an EV is the first to have a total ordering number assigned to a request. $EV_2$ loses and is told by CF that it needs to process $q_0$ instead of $p_0$. Therefore, $EV_2$ shuffles $q_0$ in front of $p_0$ and $p_1$, as indicated by the arrow arcs below $p_0$, $p_1$, and $q_0$ on $EV_2$. The dashed arrow line from number 0 on CF to $q_0$ on $EV_2$ means an EV gets the total order number of a request already assigned by another EV.

$EV_2$ proposes $p_0$ for total ordering number 1 and is accepted by CF, as indicated by the solid arrow line from $p_0$ on $EV_2$ to number 1 on CF.

$EV_2$ proposes $p_1$ for total ordering number 2 and is accepted by CF, as indicated by the solid arrow line from $p_1$ on $EV_2$ to number 2 on CF.

$EV_1$ proposes $q_1$ for total ordering number 1 but is told by CF that it needs to process $p_0$ instead. Therefore, $EV_1$ shuffles $p_0$ in front of $q_1$, as indicated by the arrow arc above $q_1$ and $p_0$ on $EV_1$, and processes $p_0$, as indicated by the dashed arrow line from number 1 on CF to $p_0$ on $EV_1$.

$EV_1$ proposes $q_1$ for total ordering number 2 but is told by CF that it needs to process $p_1$ instead. Therefore, $EV_1$ shuffles $p_1$ in front of $q_1$, as indicated by the arrow arc above $p_0$ (which is now $q_1$) and $p_1$ on $EV_1$, and processes $p_1$, as indicated by the dashed arrow line from number 2 on CF to $p_1$ on $EV_1$.

$EV_2$ proposes $p_2$ for total ordering number 3 and is accepted by CF, as indicated by the solid arrow line from $p_2$ on $EV_2$ to number 3 on CF.

$EV_1$ proposes $q_1$ for total ordering number 3 but is told by CF that it needs to process $p_2$ instead. Therefore, $EV_1$ shuffles $p_2$ in front of $p_1$ (which is now $q_1$) and $q_2$, as indicated by the arrow arcs above $p_1$ (which is now $q_1$), $q_2$, and $p_2$ on $EV_1$, and processes $p_2$, as indicated by the dashed arrow line from number 3 on CF tope on $EV_1$.

$EV_1$ proposes $q_1$ for total ordering number 4 and is finally accepted by CF, as indicated by the solid arrow line from $q_1$ on $EV_1$ to number 4 on CF. $EV_2$ also proposes $q_1$ for total ordering number 4 and is accepted by CF, as indicated by the dashed arrow line from number 4 on CF to $q_1$ on $EV_2$.

$EV_2$ proposes $q_2$ for total ordering number 5 and is accepted by CF, as indicated by the solid arrow line from $q_2$ on $EV_2$ to number 5 on CF. $EV_1$ also proposes $q_2$ for total ordering number 5 and is accepted by CF, as indicated by the dashed arrow line from number 5 on CF to $q_2$ on $EV_1$.

The function of CF for assigning the total ordering is very simple:

When an EV proposes a request with a total ordering number to the CF, if this is the first time the CF sees the proposal, or the proposed request and total ordering number match the existing ones, the CF accepts the proposal. Otherwise, the CF rejects the proposal and returns the request already assigned to the total ordering number.

Note that the CF does not verify whether a request is "eligible" for being assigned a total ordering number. It is the responsibility of the EV to guarantee that, for requests coming from any particular GW with partial seqno $w_0$, $w_1$, $w_2$, ..., the EV will consult the CF with a request $w_i$ only if all requests $w_0$, $w_1$, ..., $w_{i-1}$ have already been assigned a total ordering number. The intention, in this particular embodiment, is to keep the logic in CF as simple as possible.

Alternatively, more information may be placed in the CF to help improve certain functions of the system. For example, the system may periodically write out the entire book state in CF to speed up failure recovery, etc. But for the present embodiment, in order to assign the total ordering number, the minimal state that is kept by the CF is a list of requests and their associated total ordering numbers.

(2) Process the Requests

Figure 9:
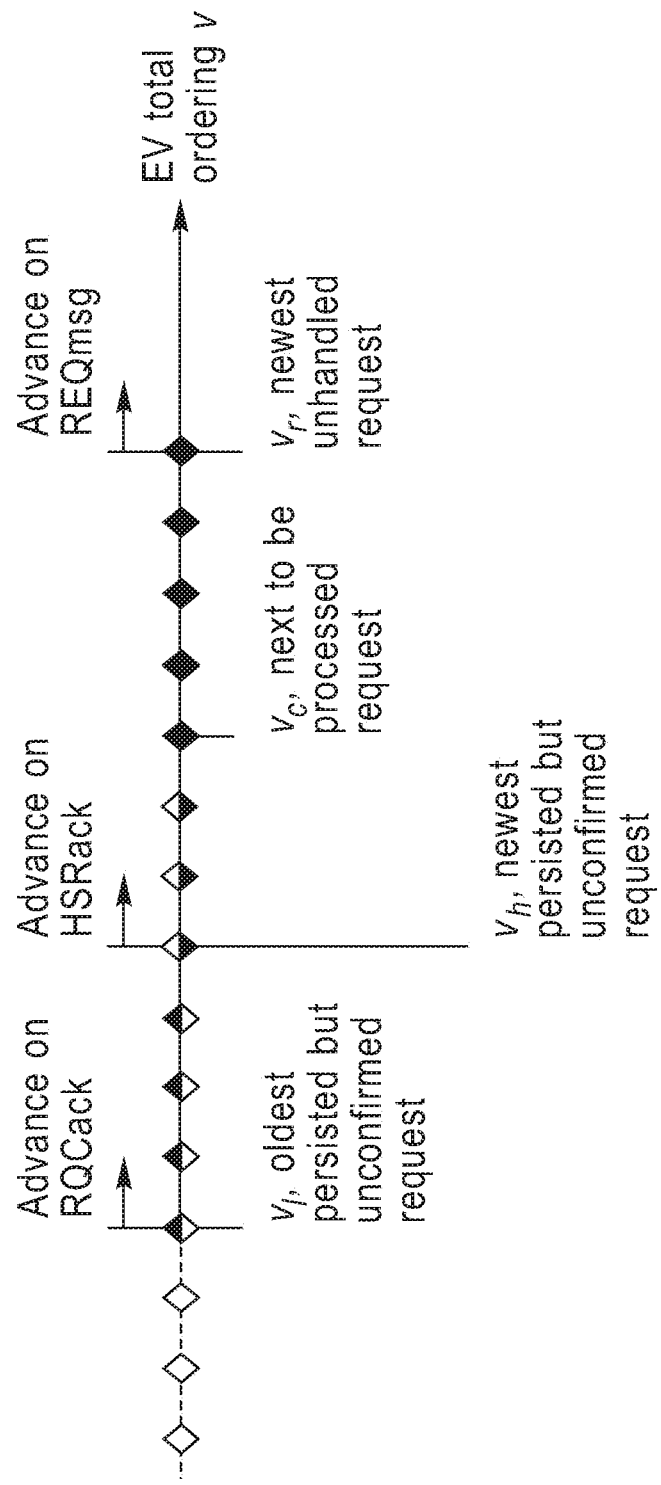
FIG. 9 shows a sliding window used by an execution venue node in processing a sequence of requests according to an embodiment of the invention.

Once an EV maps the incoming requests into the total ordering, it processes them according to the total ordering, using a sliding window scheme illustrated in FIG. 9.

As shown, the right edge of the window $v_r$ indicates the newest unhandled request. It advances each time a REQmsg is assigned a total ordering number. Note that $v_r$ does not necessarily always advance by one, it can "jump" ahead several counters.

The left edge of the window $v_l$ indicates the oldest request that has been processed, persisted, and a RQCmsg has been sent to the GW, but the GW has yet to confirm it with the RQCack. One has to be careful that $v_l$ does not advance when the EV receives a HSRack indicating that the history has been persisted. Because the EV still needs to notify the GW with a RQCmsg and this RQCmsg can be lost. So $v_l$ can advance only when the EV is sure that the GW has received the RQCmsg, which is indicated by receiving the RQCack from the GW.

Between $v_l$ and $v_r$, $v_c$ indicates the request that is expected to be processed next according to the total ordering. $v_l$ lags behind $v_c$ because the history recording for each processed request happens asynchronously. $v_c$ advances each time when a request has been processed and a HSRmsg is sent to the HR without waiting for the acknowledgement HSRack.

Between $v_l$ and $v_c$, $v_h$ indicates the newest request that has been processed, persisted, and a RQCmsg has been sent to the GW, but the GW has yet to confirm it with the RQCack. $v_h$ advances whenever a HSRack is received, which indicates that a request has been persisted, and a RQCmsg is sent to the GW without waiting for the RQCack from the GW.

Intuitively, different windows represent requests in different states, as shown:

- $[v_c, v_r]$ (black diamond shape): requests that have not been processed.
- $[v_h, v_c)$ (top white/bottom black diamond shape): requests that have been processed, but not yet persisted.
- $[v_l, v_h)$ (top black/bottom white diamond shape): requests that have been processed, persisted, but not yet confirmed by the GW.
- $( \ldots, v_l)$ (white diamond shape): requests that have been processed, persisted, and confirmed by the GW.

Initially, $v_l = v_h = v_c = v_r$ (=0 not necessary as long as the numbers are agreed upon with the CF and the HR). The inequality $v_l <= v_h <= v_c <= v_r$ holds at all times. The maximum window size of the EV is bounded by the sum of the maximum window size of all the GWs.

Figure 10:
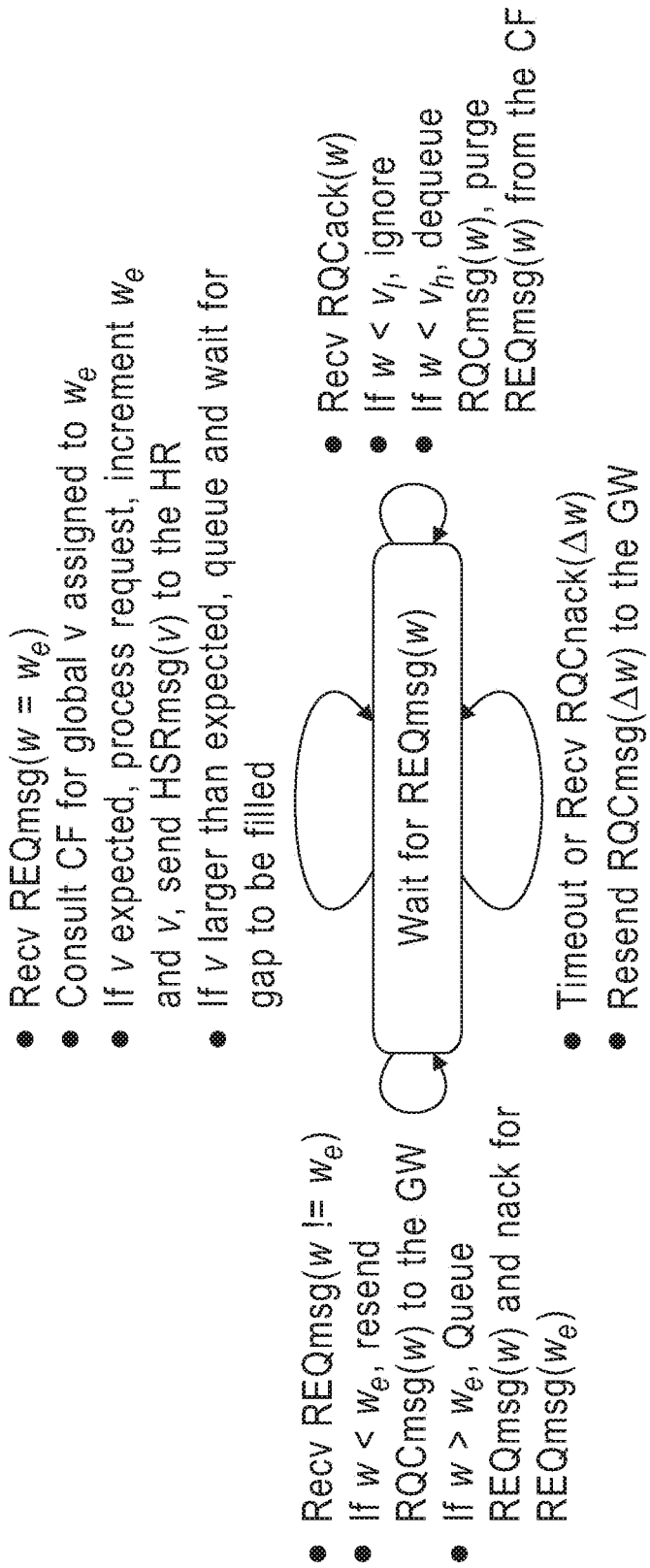
FIG. 10 shows a state transition diagram for an execution venue node according to an embodiment of the invention.

FIG. 10 illustrates the mainline EV state transition.

When the EV receives a REQmsg(gid, w), which means the GW is sending the EV request w, it takes the following actions:

For each GW, the EV maintains $w_e$, which is the next request expected from the GW's partial ordering.
If $w < w_e$, RQCmsg(gid, w) has been lost and the GW is resending REQmsg(gid, w) due to timeout, so the EV resends RQCmsg(gid, w) to the GW.
If $w > w_e$, then
  Enqueue REQmsg(gid, w).
  Nack for the lost REQmsgs by sending REQnack(gid, $w_e$, w−1) to the GW.
If $w = w_e$, then
  Increment $w_e$.
  Consult CF for the total ordering number v assigned to REQmsg(gid, w).
  Advance $v_r$ to v.
  If $v > v_c$, there is a gap in the total ordering so the EV cannot process this request and must wait for the gap to be filled.
  If $v = v_c$, then
    Process the request against the order book.
    Send HSRmsg(gid, v) to the HR.
    Install timer for HSRmsg(gid, v).
    Increment $v_c$.
  Note that it is impossible to have $v < v_c$.

When the EV receives a RQCack(gid, w), which means the GW has received RQCmsgs up to w from the EV, it takes the following actions:

Let $v_w$ be the total ordering number assigned to REQmsg (gid, w).
If $v_w < v_l$, the EV does nothing since RQCmsgs up to $v_w$ has already been confirmed and discarded.
If $v_w <= v_h$, then
  Cancel timer for all RQCmsgs from $v_l$ to $v_w$.
  Dequeue all RQCmsgs from $v_l$ to $v_w$.
  Purge all REQmsgs from $v_l$ to $v_w$ from the CF.
  Advance $v_l$ to $v_w$.
Note that it is impossible to have $v_w > v_h$.

When the EV receives a RQCnack(gid, $w_1$, $w_2$), which means the GW is missing RQCmsgs from $w_1$ to $w_2$ from the EV, it takes the following actions:

Let $v_1$ be the total ordering number assigned to REQmsg (gid, $w_1$) and $v_2$ be the total ordering number assigned to REQmsg(gid, $w_2$).
If $v_1 <= v_2 < v_l$, the EV does nothing since requests from $v_1$ to $v_2$ have already been handled and discarded.
If $v_1 < v_l <= v_2$, the EV resends RQCmsgs from $v_l$ to $v_2$.
If $v_l <= v_1 <= v_2$, the EV resends RQCmsgs from $v_1$ to $v_2$.
Note that it's impossible to have $v_1 <= v_h < v_2$ or $v_h < v_1 <= v_2$.

When the timer for RQCmsg(gid, w) fires, the EV sends RQCmsg(gid, w) to the GW. This happens when either the RQCmsg to the GW has been lost, or all the RQCacks after w from the GW have been lost.

(3) Interact with the HR and Notify the GW

When the EV finishes processing a REQmsg with expected total ordering number $v_c$, it sends a HSRmsg to the HR. Without waiting for the reply HSRack, the EV increments $v_c$ and continues to process the next REQmsg. When the HSRack arrives, the EV can notify the GW with a RQCmsg. However, the EV can not yet discard the REQmsg until it has received an acknowledgement RQCack from the GW.

Figure 11:
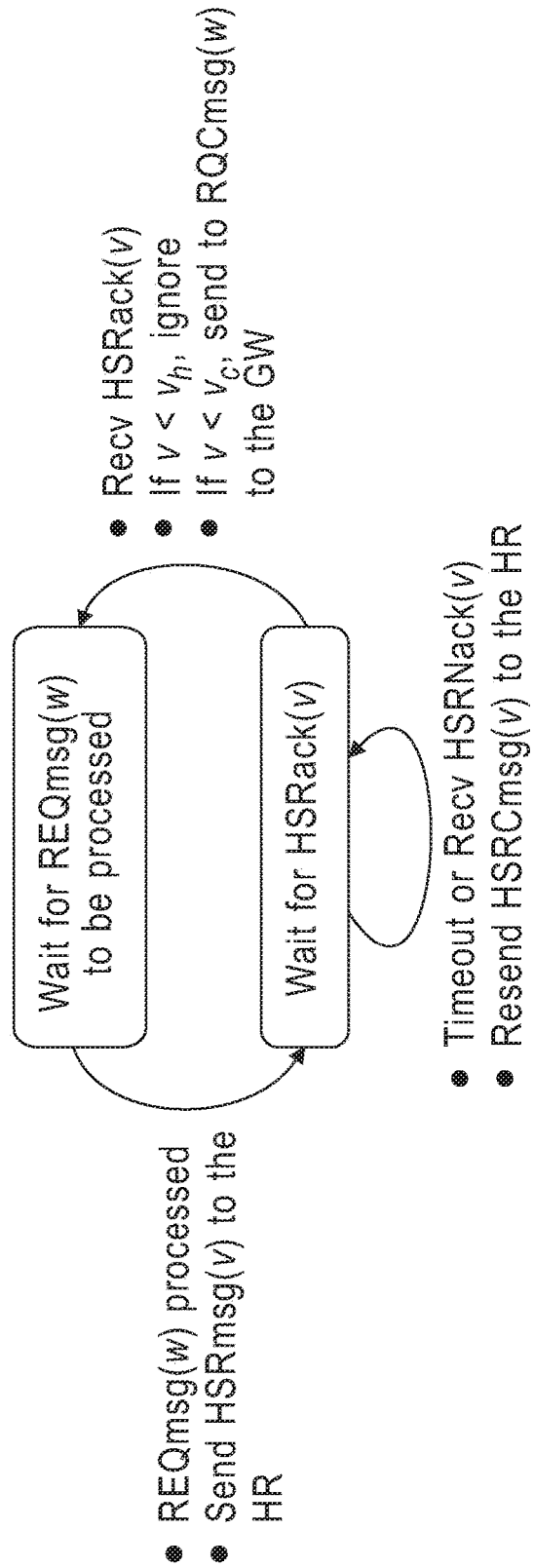
FIG. 11 shows a state transition diagram for an asynchronous history recording process according to an embodiment of the invention.

The asynchronous history recording process operates according to the state transition diagram shown in FIG. 11.

When the EV receives a HSRack(gid, v), which means the HR has persisted history recording v from the EV, it takes the following actions:

If $v < v_h$, the EV does nothing since processing, persisting, and notification for v have all been done.
If $v < v_c$, then
  Cancel timer for all HSRmsgs from $v_h$ to v.
  Send a RQCmsg to the GW for every HSRmsg from $v_h$ to v.
  Install timer for each RQCmsg sent.
  Advance $v_h$ to v.
Note that it is impossible to have $v >= v_c$.

When the EV receives a HSRnack(gid, $v_1$, $v_2$), which means the HR is missing history recording from $v_1$ to $v_2$ from the EV, it takes the following actions:

If $v_1 <= v_2 < v_h$, the EV does nothing since requests from $v_1$ to $v_2$ have already been handled.
If $v_1 < v_h <= v_2$, the EV resends HSRmsgs from $v_h$ to $v_2$.
If $v_l <= v_1 <= v_2$, the EV resends HSRmsgs from $v_1$ to $v_2$.
Note that it is impossible to have $v_1 <= v_c < v_2$ or $v_c < v_1 <= v_2$.

When the timer for HSRmsg(gid, v) fires, the EV sends HSRmsg(gid, v) to the HR. This happens when either the HSRmsg to the HR has been lost, or all the HSRacks after v from the HR have been lost.

We now describe messages and processing on the HR.

Figure 12:
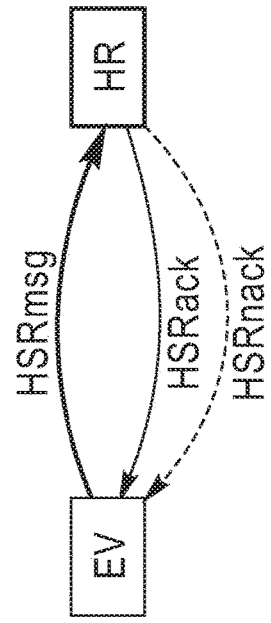
FIG. 12 shows a message type diagram for a history recorder node according to an embodiment of the invention.
Figure 13:
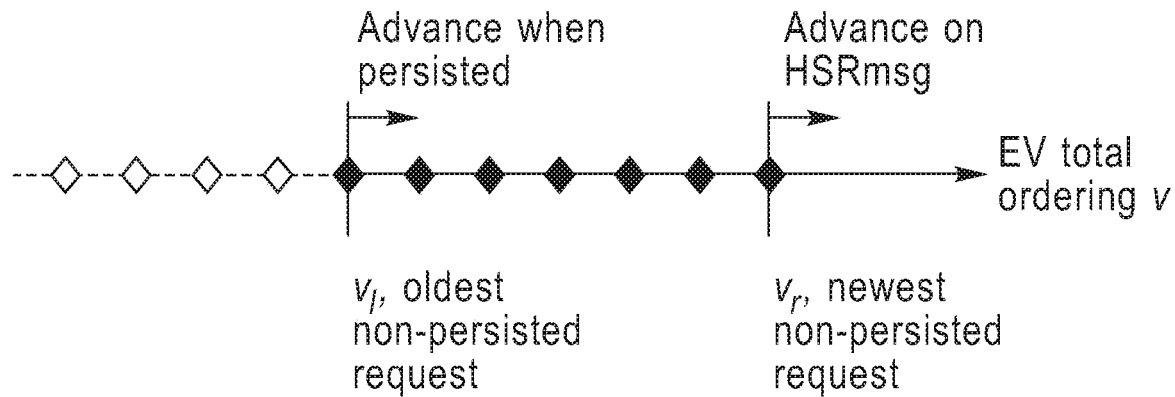
FIG. 13 shows a sliding window used by a history recorder node in processing a sequence of requests according to an embodiment of the invention.

As shown in FIG. 12, the HR sends two types of messages:
  HSRack—history recording completed, acknowledges that a HSRmsg has been persisted.
  HSRnack—history recording lost, nack that one or more HSRmsgs have been lost.
Further, as shown in FIG. 12, the HR receives one type of message:
  HSRmsg—history recording, contains trade data to be persisted.
The HR persists request history according to the total ordering determined by the EVs, using a sliding window illustrated in FIG. 13.

As shown, the left edge of the window indicates the oldest non-persisted request. It advances whenever a request has been persisted and a HSRack has been sent to the EV. The right edge of the window indicates the newest non-persisted request. It advances whenever a HSRmsg is received. The maximum window size of the HR is bounded by the maximum window size of the EV.

Figure 14:
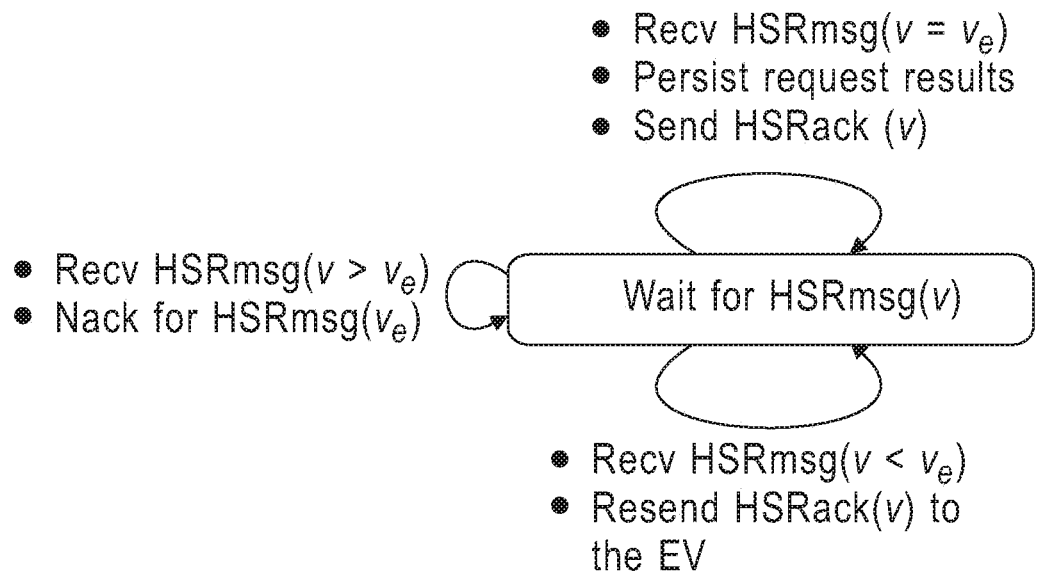
FIG. 14 shows a state transition diagram for a history recorder node according to an embodiment of the invention.

Intuitively, different windows represent requests in different states, as shown:
  $[v_l, v_r]$ (black): requests that have been received but not yet persisted.
  $( \ldots, v_l)$ (white): requests that have been received and persisted.
The HR operates according to the state transition diagram shown in FIG. 14.

When the HR receives a HSRmsg(gid, v), which means the EV is sending the HR a history recording request for v, it takes the following actions:
  The HR maintains $v_e$, which is the next request expected from the EV's total ordering number.
  If $v<v_e$, all HSRacks from v to $v_e-1$ have been lost and the EV is resending HSRmsg(gid, v) due to timeout, so the EV resends HSRack(gid, $v_e-1$) to the EV.
  If $v>v_e$, then
    Enqueue HSRmsg(gid, v).
    Nack for the lost HSRmsgs by sending HSRnack(gid, $v_e$, v−1) to the EV.
  If $v=v_e$, then
    Persist the history.
    Send HSRack(gid, v) to the EV.
    Increment $v_e$.

There are two types of EV failures that may occur and that we now address:
  Soft EV failure: the EV is operational but is lagging behind so much that the CF and/or GW no longer have the (old) protocol states necessary for the EV to interact with them.
  Hard EV failure: the EV crashes and loses all its states.

Figure 15:
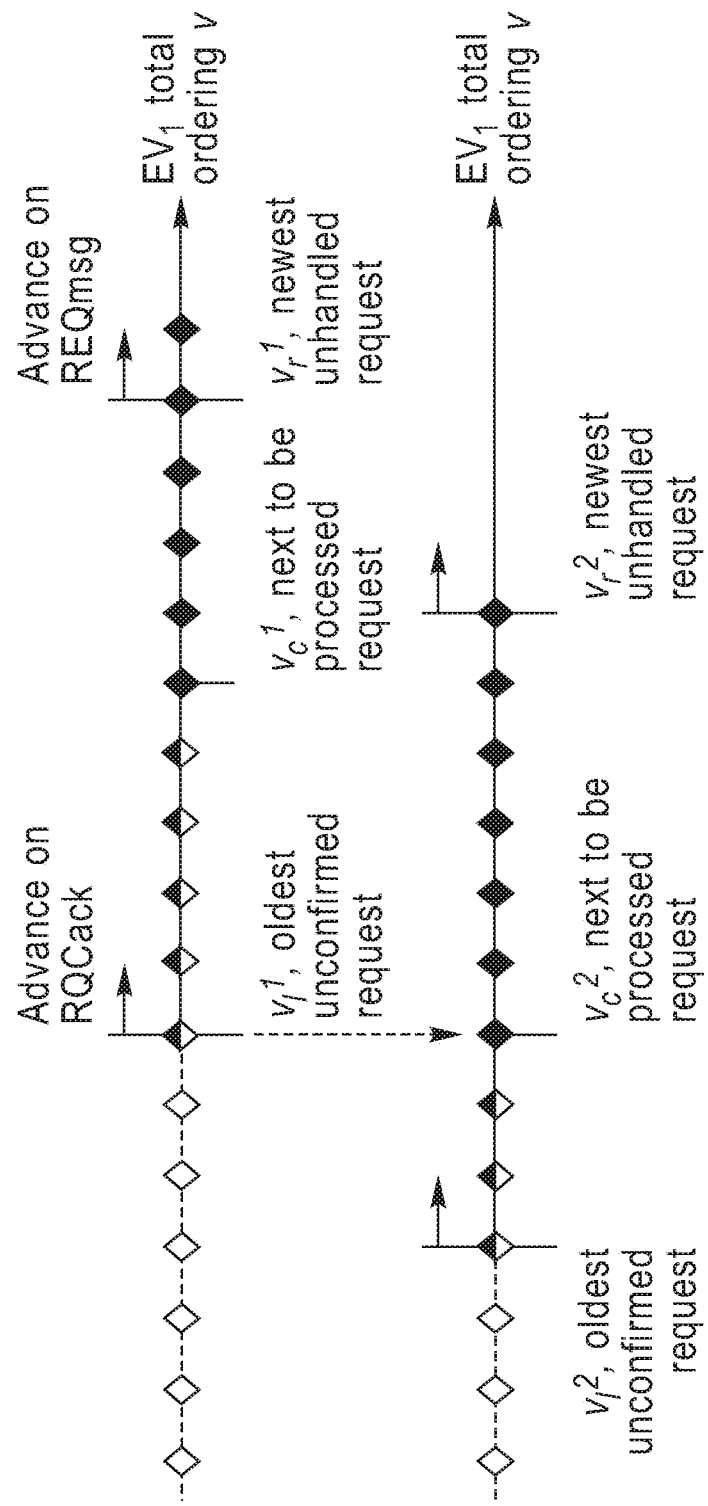
FIG. 15 shows a request ordering for two execution venue nodes or use in illustrating a soft execution venue node failure according to an embodiment of the invention.

We use an example to show the soft EV failure that can occur when the progress of one EV is lagging far behind of another. In FIG. 15, we show two EVs processing requests for the same book.

In the diagram, $EV_1$ has already finished processing, persisting, and notifying the GW up to request $v_c^1$; and the GW has confirmed receiving request persisted message up to request $v_l^1$. Meanwhile, $EV_2$ is still about to process request $v_c^2$. If $v_l^1$, advanced past $v_c^2$, as indicated in the diagram, a soft EV failure will occur. Because the GW would have discarded all states up to request $v_l^1$, and could no longer interact with $EV_2$ properly. For example, if request $v_c^2$ were lost and $EV_2$ had to nack for it, the GW could no longer send $EV_2$ the request.

We turn now to a hard EV failure. When an EV fails and loses its entire order book states, it will recover by retrieving the results of all the orders logged by the history recorder. This can be a lengthy process if the order book is traded heavily and there are many history records to retrieve. During this time, there will be only one EV covering the order book (assuming 2-node redundancy), therefore increasing the vulnerability of losing the order book if both EV fails. There are potentially multiple ways to address the problem.
  One solution is to use (3 or more)-node redundancy at the expense of increased computing resources.
  Periodically, a snapshot of the current order book can be recorded, making it unnecessary to retrieve history records prior to the snapshot.

We now describe another embodiment of the invention. This embodiment is of particular importance when an execution venue (EV) may be blocked due to the fact that it may not have received the next request which is to be processed. This would be the case, for example, if the communication between a gateway (GW) and an EV is unreliable, resulting in delayed or even lost messages.

A key feature of this embodiment is that an EV stores requests in the CF (which is analogous to shared memory 12 of FIG. 1). That way, another EV can easily access a request from the CF even if it has not yet received the request. This approach would be advantageous if storing and/or retrieving requests to/from a CF does not incur too much overhead.

We have an ordering aggregation procedure (OAG) and an execution procedure (EP) running on each execution venue (EV). The OAG collates requests received from gateways and uses the coupling facility (CF) to determine a valid total ordering (VTO). The EP executes client requests according to the VTO.

To summarize the abbreviations in alphabetic order:
  CF: coupling facility
  EP: execution procedure
  EV: execution venue
  OAG: ordering aggregation procedure
  UR[i]: unordered request list for gateway i (described later)
  VTO: valid total ordering A key observation is that in order to make progress, only one EV needs to receive a request and have it processed by its OAG. When an EV tries to execute requests, it makes use of the requests received by all of the EV's. A client c1 which for some reason has received no requests in the VTO can make as much progress executing requests as a client c2 which has received all requests in the VTO by obtaining the requests from the CF. The only performance advantage c2 would have is that at the time the EV runs, the requests could be stored locally which might offer some advantage if the increased memory latency of the CF compared with main memory latency becomes an issue. On the other hand, client c1 would have a slight performance advantage due to the fact that its OAG has not yet received any requests to collate.

The OAG operates in the following fashion. When a request r1 from gateway g1 with sequence number s1 is received by an EV, the OAG tries to add the request to the VTO using the same constraint described earlier, namely that in the VTO, requests from the same gateway have to be ordered by the sequence numbers assigned by the gateway. The CF maintains an unordered request list, UR[i], for each gateway i. UR[i] stores requests received by an EV from gateway i which cannot be added to the VTO yet because of one or more missing requests with lower sequence numbers. Because UR[i] is not expected to be very large, a list would suffice. If UR[i] does become large, a balanced tree may be used.

If the request r1 has already been processed by the CF (meaning it had previously been received by an EV), it is simply ignored. Otherwise, the OAG does one of two things with r1. If all requests from g1 with sequence numbers lower than s1 are already in the VTO, then r1 is added to the VTO. In addition, the OAG examines UR[g1] to determine whether r1 fills a whole in missing sequence numbers which allows other requests on UR[g1] to be added to the VTO.

If, on the other hand, the highest sequence number corresponding to requests from gateway g1 in the VTO is less than s1−1, request r1 is simply added to UR[g1].

The EP works as follows. When an EV denoted EV1 has spare cycles to process a request, it will be periodically polling the VTO in the CF to determine whether there are any new requests in the VTO which EV1 has not yet executed. If the answer is yes, EV1 selects the next unexecuted request, ru, in the VTO to execute. If EV1 had previously received ru, it may be able to obtain ru from its local memory. If not, it can obtain request ru from the CF.

Space in the coupling facility (CF) consumed by orders which have already fully executed is periodically reclaimed.

We now describe order book replication and load balancing.

Figure 16:
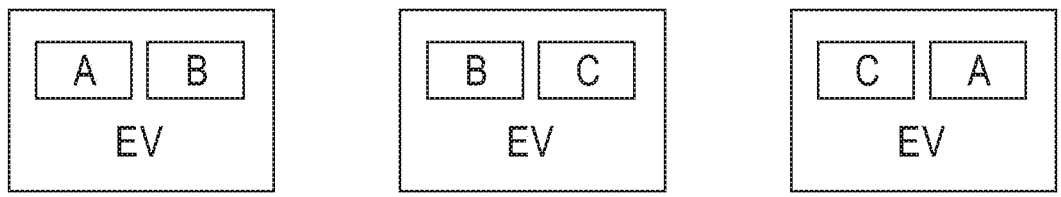
FIG. 16 shows a process for order book replication and load balancing according to an embodiment of the invention.

Since all EVs actively perform order processing computation, existing techniques such as erasure-code (widely used in the P2P network for storage replication and load distribution) can be similarly applied for replicating EVs and distributing load among them. As an example, as shown in FIG. 16, assume there are three EVs with 3 order books A, B and C. The distribution of order books on the EVs as shown in FIG. 16 will guarantee that there are two replicas of every order book and all three order books are still covered when any one of the EV goes down.

We make an important observation that when an EV is overloaded, typically it is the CPU, not the memory, which is overloaded. A common way of addressing the problem by migrating hot order books off the overloaded EV can be complex and disruptive. On the Z platform, zWLM (z WorkLoad Manager) and IRD (Intelligent Resource Director) can effectively manage CPU resources to alleviate the need for migrating hot order books, as follows:

At application level, zWLM can dynamically adjust CPU resource among JVMs

At LPAR level, IRD (Intelligent Resource Director-zWLM Hypervisor Automatic

Resource Balancer feature) can dynamically adjust CPU resource among LPARs

In other words, instead of moving hot order books away from the overloaded EV, we can simply give more CPU resource to the overloaded EV.

Figure 17:
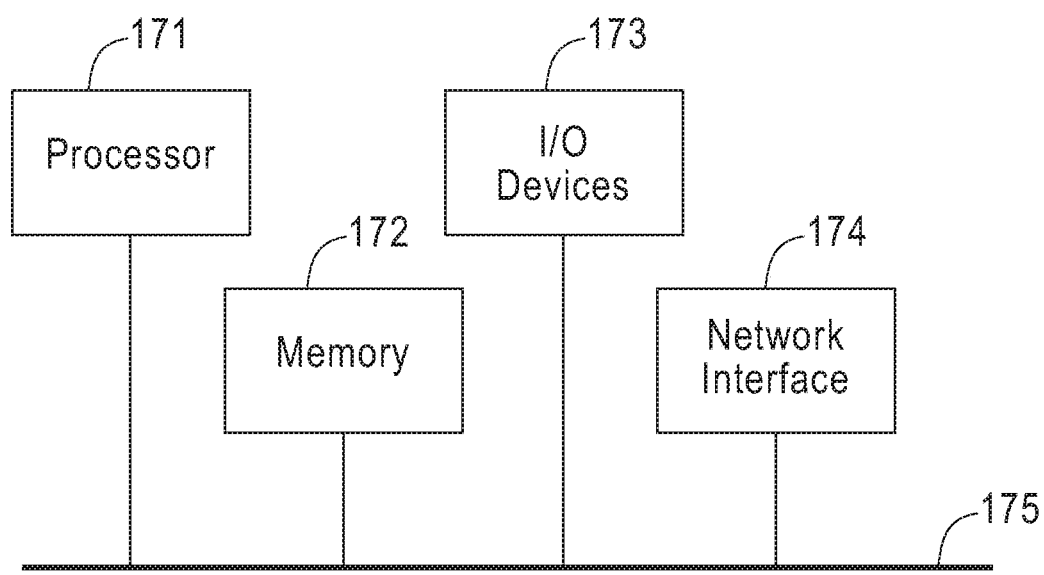
FIG. 17 shows a computer system wherein transaction ordering techniques may be implemented according to one embodiment of the invention.

Referring lastly to FIG. 17, a computer system is illustrated wherein techniques for ordering of transaction processing may be implemented according to an embodiment of the invention. That is, FIG. 17 illustrates a computer system in accordance with which one or more components/steps of the transaction ordering techniques (e.g., components and methodologies described above in the context of FIGS. 1 through 16) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 17 may represent one or more servers or one or more other processing devices capable of providing all or portions of the functions described herein. Alternatively, FIG. 17 may represent a mainframe computer system.

As shown, the computer system includes processor 171, memory 172, input/output (I/O) devices 173, and network interface 174, coupled via a computer bus 175 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
in a distributed computing system comprising a plurality of computing nodes in communication with a coupling facility comprising a memory shared by the plurality of computing nodes, a first computing node of the plurality of computing nodes receiving a first request;
the first computing node sending a message to the coupling facility proposing that the first request be assigned a first total ordering number;

in response to the coupling facility not having any request in the shared memory assigned the first total ordering number:
the first computing node receiving an acknowledgment from the coupling facility that the first total ordering number has been accepted for the first request; and
the first computing node executing the first request in accordance with the first total ordering number; and
in response to the coupling facility already having a second request from a second computing node of the plurality of computing nodes with the first total ordering number in the shared memory:
the first computing node receiving a message from the coupling facility indicating that the second request has the first total ordering number;
the first computing node executing the second request in accordance with the first total ordering number; and
the first computing node sending a message to the coupling facility proposing that the first request be assigned a second total ordering number different than the first total ordering number.

2. The method of claim 1, wherein the distributed computing system further comprises at least a first gateway node in communication with the first computing node, the first gateway node maintaining a sliding window of requests.

3. The method of claim 2, wherein the sliding window of requests comprises:
a first edge representing a newest request received by the first gateway node which has not been sent to the first computing node;
a second edge representing an oldest request sent to the first computing node that has not been executed; and
a pointer to a next request in the sliding window to be sent to the first computing node.

4. The method of claim 1, wherein the distributed computing system further comprises a history recorder node in communication with the first computing node, the history recorder node maintaining a sliding window of requests.

5. The method of claim 4, wherein the sliding window of requests comprises:
a first edge representing a newest request received from the first computing node which has not been stored persistently by the history recorder node; and
a second edge representing an oldest request received from the first computing node which has not been stored persistently by the history recorder node.

6. The method of claim 1, wherein the distributed computing system further comprises a first gateway node and a history recorder node in communication with the first computing node, the first computing node maintaining a sliding window of requests.

7. The method of claim 6, wherein the sliding window comprises:
a first edge representing a newest request received from the first gateway node which has not been executed by the first computing node;
a second edge representing an oldest request received from the first gateway node which has been executed by the first computing node but not yet confirmed by the first gateway node; and
a middle edge between the first edge and the second edge representing a newest request which has been handled by the first computing node and sent to the history recorder node but has not been acknowledged by the history recorder node.

8. A distributed computing system comprising:
a plurality of computing nodes; and
a coupling facility comprising a memory shared by the plurality of computing nodes, the coupling facility being in communication with the plurality of computing nodes;
wherein a first computing node of the plurality of computing nodes is configured:
to receive a first request;
to send a message to the coupling facility proposing that the first request be assigned a first total ordering number;
in response to the coupling facility not having any request in the shared memory assigned the first total ordering number: to receive an acknowledgment from the coupling facility that the first total ordering number has been accepted for the first request; and to execute the first request in accordance with the first total ordering number; and
in response to the coupling facility already having a second request from a second computing node of the plurality of computing nodes with the first total ordering number in the shared memory: to receive a message from the coupling facility indicating that the second request has the first total ordering number; to execute the second request in accordance with the first total ordering number; and to send a message to the coupling facility proposing that the first request be assigned a second total ordering number different than the first total ordering number.

9. The system of claim 8, wherein the distributed computing system further comprises at least a first gateway node in communication with the first computing node, the first gateway node being configured to maintain a sliding window of requests.

10. The system of claim 9, wherein the sliding window of requests comprises:
a first edge representing a newest request received by the first gateway node which has not been sent to the first computing node;
a second edge representing an oldest request sent to the first computing node that has not been executed; and
a pointer to a next request in the sliding window to be sent to the first computing node.

11. The system of claim 8, wherein the distributed computing system further comprises a history recorder node in communication with the first computing node, the history recorder node being configured to maintain a sliding window of requests.

12. The system of claim 11, wherein the sliding window of requests comprises:
a first edge representing a newest request received from the first computing node which has not been stored persistently by the history recorder node; and
a second edge representing an oldest request received from the first computing node which has not been stored persistently by the history recorder node.

13. The system of claim 8, wherein the distributed computing system further comprises a first gateway node and a history recorder node in communication with the first computing node, the first computing node being further configured to maintain a sliding window of requests.

14. The system of claim 13, wherein the sliding window comprises:
a first edge representing a newest request received from the first gateway node which has not been executed by the first computing node;

a second edge representing an oldest request received from the first gateway node which has been executed by the first computing node but not yet confirmed by the first gateway node; and a middle edge between the first edge and the second edge representing a newest request which has been handled by the first computing node and sent to the history recorder node but has not been acknowledged by the history recorder node.

15. A computer program product comprising a non-transitory computer-readable storage medium for storing computer readable program code which, when executed by a first computing node of a plurality of computing nodes in a distributed computing system that is in communication with a coupling facility comprising a memory shared by the plurality of computing nodes, causes the first computing node:

to receive a first request;

to send a message to the coupling facility proposing that the first request be assigned a first total ordering number;

in response to the coupling facility not having any request in the shared memory assigned the first total ordering number: to receive an acknowledgment from the coupling facility that the first total ordering number has been accepted for the first request; and to execute the first request in accordance with the first total ordering number; and in response to the coupling facility already having a second request from a second computing node of the plurality of computing nodes with the first total ordering number in the shared memory: to receive a message from the coupling facility indicating that the second request has the first total ordering number; to execute the second request in accordance with the first total ordering number; and to send a message to the coupling facility proposing that the first request be assigned a second total ordering number different than the first total ordering number.

16. The computer program product of claim 15, wherein the distributed computing system further comprises at least a first gateway node in communication with the first computing node, the first gateway node maintaining a sliding window of requests, the sliding window of requests comprising:

a first edge representing a newest request received by the first gateway node which has not been sent to the first computing node;

a second edge representing an oldest request sent to the first computing node that has not been executed; and a pointer to a next request in the sliding window to be sent to the first computing node.

17. The computer program product of claim 15, wherein the distributed computing system further comprises a history recorder node in communication with the first computing node, the history recorder node maintaining a sliding window of requests.

18. The computer program product of claim 17, wherein the sliding window of requests comprises:

a first edge representing a newest request received from the first computing node which has not been stored persistently by the history recorder node; and a second edge representing an oldest request received from the first computing node which has not been stored persistently by the history recorder node.

19. The computer program product of claim 15, wherein the distributed computing system further comprises a first gateway node and a history recorder node in communication with the first computing node, the first computing node maintaining a sliding window of requests.

20. The computer program product of claim 19, wherein the sliding window comprises:

a first edge representing a newest request received from the first gateway node which has not been executed by the first computing node;

a second edge representing an oldest request received from the first gateway node which has been executed by the first computing node but not yet confirmed by the first gateway node; and a middle edge between the first edge and the second edge representing a newest request which has been handled by the first computing node and sent to the history recorder node but has not been acknowledged by the history recorder node.

* * * * *